United States Patent [19]

Grimsley

[11] 4,090,805
[45] May 23, 1978

[54] CUTTING TOOL FOR REMOVING GOVERNOR CHEST NOZZLES AND REFINISHING THE NOZZLE SEATS

[76] Inventor: Ernest E. Grimsley, 4533 Wake Forest Rd., Portsmouth, Va. 23703

[21] Appl. No.: 819,929

[22] Filed: Jul. 28, 1977

[51] Int. Cl.² .................. B23B 41/00; B23B 47/18
[52] U.S. Cl. ................................. 408/111; 408/138; 90/12.5
[58] Field of Search .......... 408/111, 110, 137, 138, 408/72 R, 101, 102, 708, 709; 90/12.5

[56] References Cited

U.S. PATENT DOCUMENTS

| 1,527,143 | 2/1925 | Lakes | 90/12.5 |
| 3,286,553 | 11/1966 | Spencer et al. | 90/12.5 X |
| 4,011,793 | 3/1977 | Grimsley | 90/12.5 |

Primary Examiner—Gil Weidenfeld
Attorney, Agent, or Firm—Griffin, Branigan and Butler

[57] ABSTRACT

A portable cutting tool is mounted on the top of a governor chest after the chest cover and valving mechanisms have been removed from the chest. The cutting tool rotates and axially advances a cutting head to cut away the weld material which welds a nozzle to a wall of the governor chest. This permits removal and replacement of the nozzle. The cutting tool is mounted on a mounting plate so as to permit selection of one of several locations as the cutting site, thus permitting use of a single cutting tool to effect the removal of all the nozzles within a governor chest. The cutting head carries two tool bits which cut in annular overlapping paths and the cutting head is recessed so it may pass over a nozzle as a weld is cut. A second cutter head is provided for refinishing the nozzle seats after the nozzles have been removed. Different interchangeable mounting plates permit the cutting tool to be utilized on governor chests of different sizes or having different spacings between nozzles.

8 Claims, 11 Drawing Figures

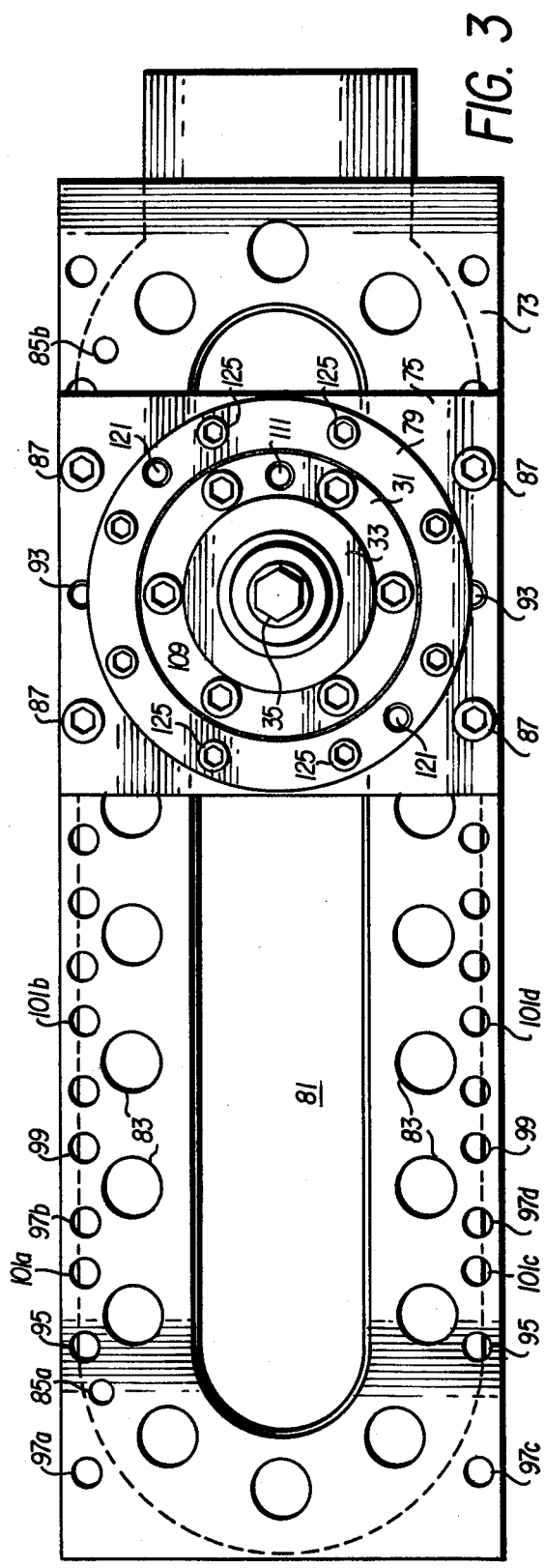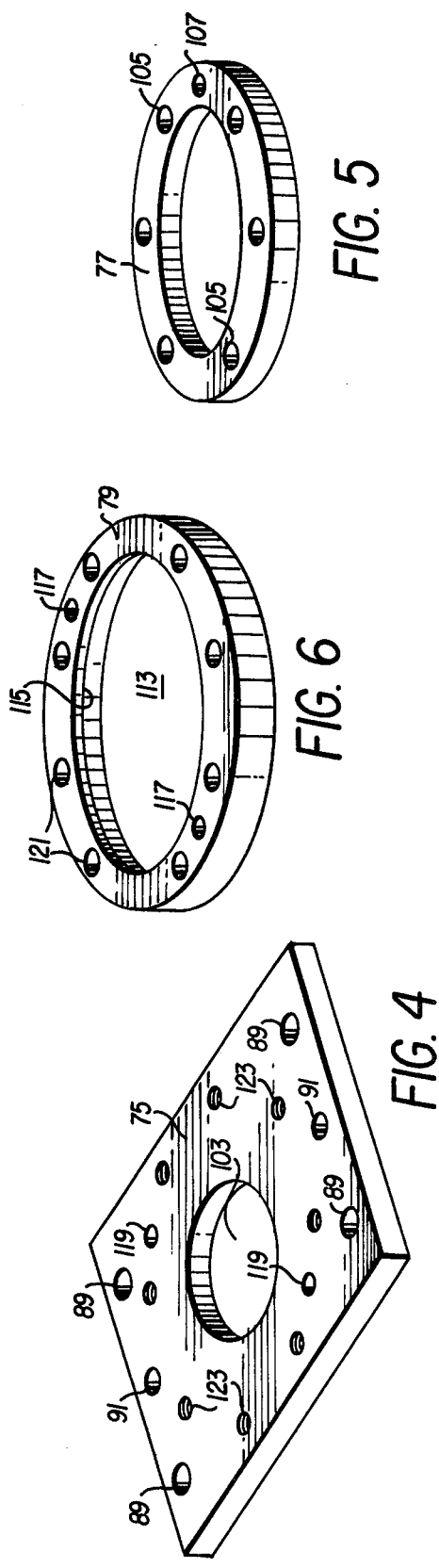

CUTTING TOOL FOR REMOVING GOVERNOR CHEST NOZZLES AND REFINISHING THE NOZZLE SEATS

BACKGROUND OF THE INVENTION

The present invention relates to a cutting tool and more particularly to a cutting tool specifically adapted to cut the welds holding nozzles in the wall of a governor chest and, after removal of the nozzles, refinishing the nozzle seating surfaces of the wall.

A governor chest finds use as a speed control device in steam driven turbines. Typically, a governor chest has an inlet for steam, a valving chamber, a removably affixed top cover, and a plurality of outlet nozzles welded in openings in the bottom wall of the chest and extending upwardly from the interior surface of the bottom wall. A control mechanism extending through the top cover operates a mechanism within the chest to in turn operate a plurality of valves. The valves selectively block the nozzles and are operated in a preselected sequence to permit more or less steam to pass through the nozzles to the turbine.

The nozzles in the governor chest must frequently be replaced because of corrosion, wear, and the cutting action of high pressure steam. At the present time, the usual process of removing a nozzle requires the use of hand-held and make-shift cutting tools for cutting away the weld material which holds the nozzle in the bottom wall of the chest. Experience has shown that it is difficult to cut away the weld material utilizing present methods. The tool "chatters" or jumps about as the cutter tool bit rapidly and repeatedly strikes the weld material. The chatter makes it difficult to hold the tool in its proper position and as a result it frequently damages the surface on which the nozzle is seated. When the seating surface is damaged, it frequently requires that the entire governor chest be removed for repair or replacement, a very expensive and time-consuming operation. Also, once the weld material has been cut away and the nozzle extracted from the wall of the chest, the turbine casing containing the nozzle block has to be removed to the machine shop for remachining if the nozzle seating surfaces are damaged.

SUMMARY OF THE INVENTION

An object of the present invention is to provide a cutting tool which may be securely mounted on a governor chest after the chest cover is removed, whereby chatter of the cutting tool is eliminated as the cutter cuts away the weld holding a nozzle in a wall of the chest.

An object of the present invention is to provide a cutting tool for removing nozzles from a governor chest, the nozzles being seated in, and welded to, the bottom of the governor chest, the cutting tool comprising: an adapter plate having an elongated opening therein and adapted for mounting on the top of the governor chest after the cover has been removed therefrom; means for attaching the adapter plate to the governor chest; a drive shaft; support means supporting the drive shaft for movement along and about its own axis, the support means supporting the drive shaft in a position extending through the opening in the adapter plate whereby the top of the drive shaft is above the plane of the adapter plate and the bottom is within the governor chest; attachment means for attaching the support means to the adapter plate at any one of a plurality of lateral positions, the axis of the drive shaft being centered over one of the nozzles at each of the lateral positions; a cutter head attached to the drive shaft and carrying tool bit means for cutting the weld material which welds the nozzles to the bottom of a governor chest; and means for rotating and axially advancing the drive shaft. The support means includes a mounting plate and the attachment means includes dowels and screws, the mounting plate having a set of openings into which the dowels and screws may be inserted and the adapter plate having a plurality of sets of holes for receiving the dowels and screws after they have passed through the mounting plate, the adapter plate having a number of sets of holes corresponding to the number of lateral positions.

A further object of the invention is to provide a cutting tool as described above wherein the cutter head includes a cutter body having a recess in its lower surface whereby the upper extremity of a nozzle may pass into the recess as the tool bit means cuts the weld material. Preferably, the tool bit means comprises two bits and means for mounting the tool bits at diametrically opposed positions on the cutter body. In a preferred embodiment, the two bits are mounted to traverse different but overlapping annular paths as the drive shaft and cutter head are rotated.

A further object of the invention is to provide a cutting tool as described above wherein the adapter plate is easily replaceable whereby different adapter plates may be utilized thus adapting the cutting tool for use on governor chests of different sizes and having different spacings between nozzles.

Other objects of the invention and its mode of operation will become apparent upon consideration of the following description and the accompanying drawings.

BRIEF DESCRIPTION OF THE DRAWINGS

FIG. 3 is a top view of a cutting tool;

FIG. 4 shows details of a mounting plate;

FIG. 5 shows details of an adjusting plate;

FIG. 6 shows details of a retainer plate;

DETAILED DESCRIPTION OF THE INVENTION

Figure 1:
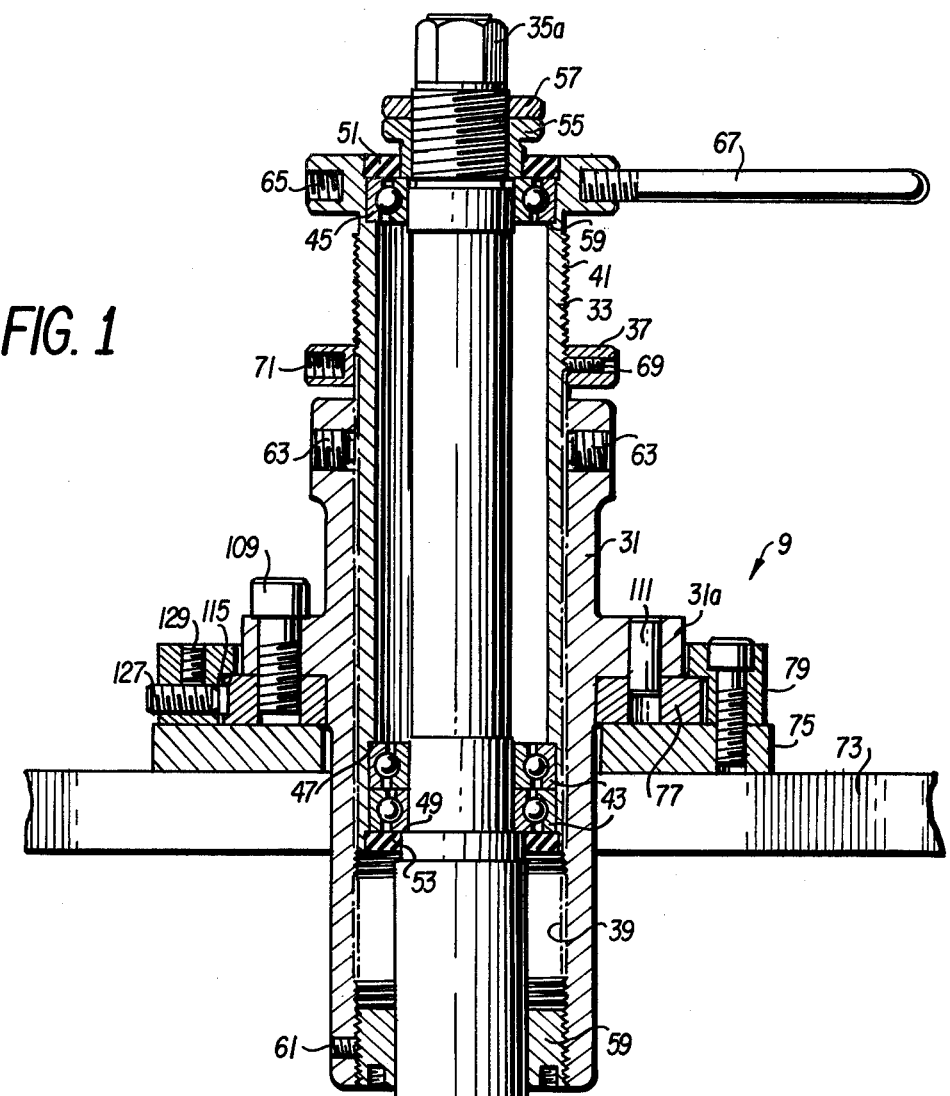
FIG. 1 is a front sectional view showing a cutting tool in weld-cutting position on a governor chest.

FIG. 1 is a sectional view of the invention as it would appear mounted and in use on the governor chest of a steam turbine. The bottom portion 1 of the governor chest is provided with a plurality of openings or bores with only two of these openings, 3 and 5, being illustrated in FIG. 1. It should be understood that the governor chest has side walls extending upwardly to the plane designated A—A, and that a top cover plate is doweled and bolted to the sidewalls. The top cover plate of the governor chest as well as the valves and the valve operating mechanisms within the chest are removed before the cutting tool 9 is placed in position for use.

In FIG. 1, nozzle 11 illustrates the condition of a nozzle prior to the beginning of the removal and reboring operation. Nozzle 11 is mounted in the bore 3 which extends through the bottom wall of the governor chest 1. The nozzle has an annular flange 11a which rests on an abutment 1a of the governor chest. A recess 13 is provided in the upper surface of governor chest 1 around each nozzle and the upper surface of the flange 11a lies in the plane of the bottom of the recess. Welding material 15 is provided around the periphery of the nozzle in the recess 13 to weld the flange 11a to the governor chest 1. This prevents upward movement of the nozzle 11.

In order to replace a nozzle 11, it is necessary to first remove the weld material 15. To accomplish this, a cutter head 17 carrying two tool bits 19 and 21 is attached to the bottom of cutting tool 9 and the tool is mounted in position on top of the governor chest. As shown in FIG. 1, the cutter head 17 is then rotated and moved axially downwardly thereby progressively removing the weld material 15. FIG. 1 shows the position of the tool bits 19 and 21 after they have completely removed any weld material holding the nozzle 23 in bore 5.

Figure 1A:
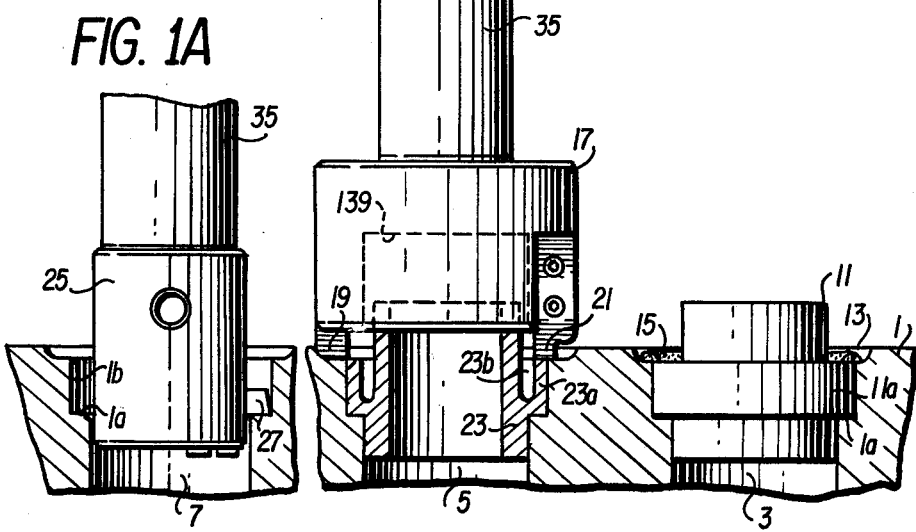
FIG. 1a is a sectional view of a wall of a governor chest after a nozzle has been removed therefrom and at the point where a cutting tool is just completing the refinishing of the seating surfaces for a new nozzle.

After the weld material is removed, the cutting tool 9 is removed from the top of the governor chest after which the nozzle 23 may be extracted from the wall of the governor chest. Once the nozzle has been extracted, the interior surfaces of bore 5 which seat the nozzle may need refinishing if steam cut. To accomplish this, the cutter head 17 (FIG. 1) is replaced with a cutter head 25 (FIG. 1A) having a single tool bit 27. The cutting tool 9 is then replaced on the governor chest and fastened in position after which the cutter head 25 is rotated and moved axially downwardly so that the tool bit 27 refinishes the surfaces 1a and 1b. After these surfaces have been refinished, the cutting tool 9 may be removed from the top of the governor chest, a new nozzle inserted into the refinished bore 7, and weld material applied as shown at 15 in FIG. 1 to secure the new nozzle in place. The operating mechanisms and the cover to the governor chest may then be replaced.

Figure 2:
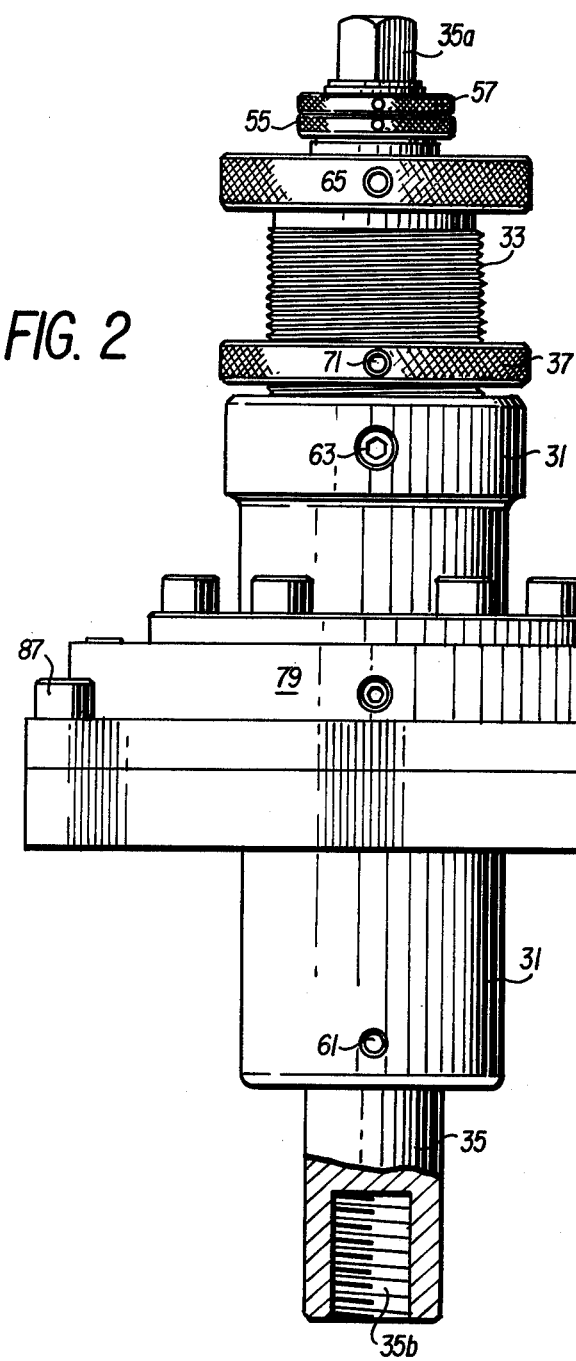
FIG. 2 is a left side view, partly in section, of the cutting tool illustrated in FIG. 1.

The cutting tool 9 for rotationally and axially moving the cutter heads 17 and 25 is similar to the boring bar disclosed in U.S. Pat. No. 4,011,793. As illustrated in FIGS. 1 and 2, it comprises a housing 31, a feed screw 33, a drive shaft 35, and a lock ring 37. The housing 31 is essentially a hollow cylinder having interior threads 39 extending throughout its length. These threads mesh with exterior threads 41 provided on the feed screw 33. The lock ring 37 is also provided with interior threads which mesh with the threads 41 on the feed screw.

The feed screw 33 is also essentially a hollow cylinder and the drive shaft 35 extends axially through the feed screw. The drive shaft 35 is supported by a pair of lower bearings 43 and an upper bearing 45. The uppermost bearing 43 engages an abutment 47 on the interior of feed screw 33 while the lowermost bearing 43 engages an abutment 49 on the drive shaft 35. Oil seals 51 and 53 are located above bearing 45 and below the lowermost bearing 43.

A portion of the drive shaft 35 extending above feed screw 33 is threaded to receive a thrust ring 55 and a lock ring 57. Thrust ring 55 is tightened to press against bearing 45 which is held from downward movement by an abutment 59 on the interior of the feed screw 33. As the thrust bearing is tightened it draws drive shaft 35 upwardly until abutment 49 presses bearings 43 against the abutment 47. The lock ring 57 is then tightened against thrust ring 55 to firmly hold drive shaft 35 against any axial movement relative to the feed screw 33.

The upper end of drive shaft 35 is hexagonally shaped at 35a, or otherwise adapted to receive the drive coupling of a rotary power source (not shown). As best shown in FIG. 2 the lower end of drive shaft 35 is provided with an axially extending threaded recess 35b for receiving the threaded stub shafts of cutter heads such as those illustrated in FIGS. 7 and 9.

A nylon bearing 59 is provided at the lower extremity of housing 1 to give further support to the drive shaft 35 and to seal the interior of the housing to prevent the entry of dirt therein. Bearing 27 is held in place by a set screw 61.

The housing 31 is drilled and tapped at a plurality of locations to receive set screws 63 having nylon noses. These set screws prevent unwanted rotation of feed screw 33 relative to housing 31 except when the feed screw 33 is manually rotated. The feed screw is provided with an enlarged upper end portion having a plurality of holes 65 for receiving drive pins or a threaded handle 67. Lock ring 37 is provided with a single nylon nosed set screw 69 which prevents inadvertent rotation of the lock ring except when it is manually rotated. One or more holes 71 may be provided in the lock ring to receive a pin or a threaded handle for rotating the lock ring.

The cutting tool 9 is mounted on the governor chest by an assembly comprising an adapter plate 73, a mounting plate 75, an adjustment plate 77 and a retainer plate 79.

The adapter plate 73 is a thick, flat, steel plate having an elongated opening 81 therein as is illustrated in FIG. 3. The plate 73 is adapted to mate with the top surface of the governor chest after the top cover of the governor chest has been removed. Plate 73 is provided with a plurality of holes 83 by means of which the plate 73 may be mounted on the top of the governor chest. Bolts (not shown) may be extended through the holes 83 and into the periphery of the top surface of the governor chest to secure the plate 73 to the chest. The top of the governor chest is normally provided with one or more dowel holes for accurately positioning the cover of the governor chest relative to the lower portion thereof. Plate 73 is provided with a pair of dowel holes 85a and 85b through which dowels may be extended into the body of the governor chest thereby accurately locating adapter plate 73 relative to the governor chest.

The mounting plate 75 is attached to the top of adapter plate 73 by means of a plurality of screws 87. As shown in FIG. 4, mounting plate 75 is provided with a plurality of holes 89 through which the screws 87 may pass and two dowel holes 91 through which two dowels 93 may pass. It should be noted that the adapter plate 73 shown in FIG. 3 is intended for use on a governor chest having six nozzles therein. Therefore, the mounting plate 75 and the adapter plate 73 are adapted such that the plate 75 may be secured to the plate 73 at any one of six locations. In each of these locations the axis of drive shaft 35 will be centered over one of the nozzles in the governor chest. In order to mount the plate 75 in the left-most position on the adapter plate 73 of FIG. 3, the plate 75 would be positioned such that the dowel holes 91 in plate 75 align with dowel holes 95 in plate 73. Dowels 93 are then inserted through holes 91 and 95 to properly locate the plate 75 relative to plate 73. Next, the screws 87 are inserted through the holes 89 in plate 75 and screwed into the holes 97a–97d in the plate 73.

As a further example of the positioning of plate 75, assume that it is desired to locate the plate one position to the right of the left-most position. In this case, dowels 73 are driven through holes 91 in plate 75 and into the holes 99 in plate 73. Screws 87 are then inserted through holes 89 in plate 75 and tightened into the threaded holes 101a–d in plate 73.

It will be obvious that by employing different adapter plates having different spacings of threaded holes 97a–d, 101a–d, etc., one cutting tool may be utilized with different governor chests even though the spacings between the nozzles in the different chests may vary.

Mounting plate 75 has a centrally located opening 103 through which the housing 31 of cutting tool 9 may pass. The opening 103 is made slightly larger than the diameter of housing 31 so that the position of the housing 31 may be laterally adjusted relative to plate 75. As illustrated in FIG. 1, housing 31 has a flange portion 31a by means of which the housing is attached to the adjusting plate 77. As illustrated in FIG. 5, adjusting plate 77 is an annular member having a plurality of threaded holes 105 and a dowel hole 107. Flange 31a is also provided with a dowel hole and a plurality of holes through which screws may be extended into the plate 77. A dowel 111 (FIGS. 1 and 3) extends through flange 31a and into the dowel hole 105 to accurately position cutting tool housing 31 relative to the adjusting plate 77.

Cutting tool housing 31 is inserted through the opening 103 in mounting plate 75 so that the adjusting plate 77 rests on the upper surface of the plate 75. Retainer plate 79 is provided with a central opening 113 which has a smaller diameter toward its top surface and a larger diameter toward its lower surface as is best illustrated in FIGS. 1 and 6. These differing diameters create an abutment 115 which retains adjusting plate 77 against the upper surface of plate 75. Two dowel holes 117 are provided in plate 79 and two matching dowel holes 119 are provided in plate 75 to accurately position the plates relative to each other when two dowel pins 121 (FIG. 3) are inserted in the holes 117 and 119. Plate 79 is provided with a plurality of holes 121 and plate 75 has matching threaded holes 123. A plurality of screws 125 are inserted through holes 121 and into holes 123 to hold plate 79 firmly against the upper surface of plate 75.

In order to adjust for minor misalignments of the nozzles, it is desirable that the housing 31 be laterally adjustable relative to adapter plate 73 so that drive shaft 35 may be positioned exactly coaxial with the axis of a nozzle bore. This adjustment is accomplished by providing retainer plate 79 with four threaded screws 127 (FIG. 1) which extend radially inwardly from the periphery of the plate. The periphery of plate 77 is notched to provide flat surfaces against which the screws 127 may press. By selectively adjusting the four screws 127, the position of plate 77 and thus, the position of housing 31 and drive shaft 35 may be varied within a small range. Four lock screws 129 having nylon noses are provided for locking the screws 127.

Figure 7:
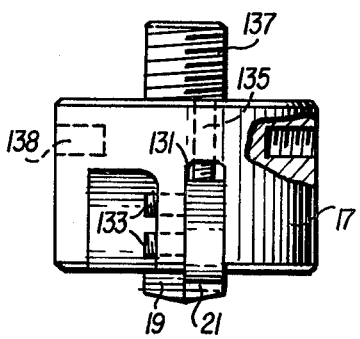
FIG. 7 is a side view, partly in section, of a cutter head utilized to remove weld material holding a nozzle in a governor chest.
Figure 8:
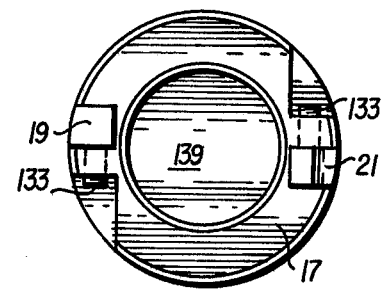
FIG. 8 is a bottom view of FIG. 7.

FIGS. 7 and 8 show details of the cutter head 17. The body of the cutter head is provided with two diametrically opposed slots 131 for receiving the two tool bits 19 and 21. Two set screws 133 are provided to lock each bit in position. A further set screw 135 is provided for each tool bit to adjust its vertical position. The cutter head is provided with a threaded stud 137 which is adapted to be screwed into the opening 35b in the drive shaft 35. One or more holes 138 may be provided in the cutter head 17 for the insertion of a drive pin (not shown) which is used for tightening or loosening the cutter head on the drive shaft. A recess 139 (FIGS. 1 and 8) is provided in the bottom surface of the cutter head. The upper extremity of a nozzle extends into this recess as the cutter head is lowered to cut away the weld material.

As is evident from inspection of FIG. 1, the tool bits 19 and 21 differ in shape and traverse different but overlapping annular paths as the shaft 35 is rotated. Tool bit 19 has a curved edge which matches the curvature around the edges of recess 13 in the chest 1. Bit 19 cuts away welding material extending from the outer diameter of the recess 13 to a point approximately at the outer diameter of the annular flange 23a on the nozzle 23. Tool bit 21 on the other hand, cuts away weld material extending from the inner edge of flange 23a to a point slightly beyond the outer edge of flange 23a. These two overlapping paths of the cutters 19 and 21 remove all weld material since the weld material should not extend into the region of the annular recess 23b.

Figure 9:
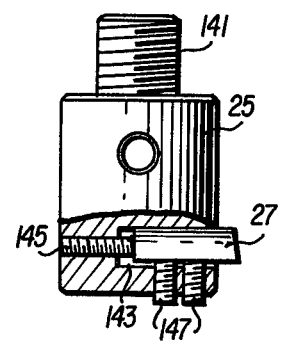
FIG. 9 is a side view, partly in section, of a cutter head employed to refinish the seating surfaces in the wall of a governor chest after a nozzle has been removed therefrom; and, FIG. 10 is a bottom view of the cutter head of FIG. 9.
Figure 10:
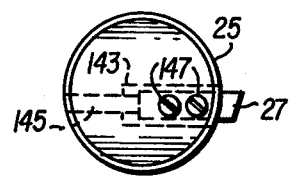

FIGS. 9 and 10 show the details of the cutter head 25. It is provided with a threaded stub shaft 141 which is adapted to be received into the threaded opening 35b of the drive shaft 35. The head 25 has a single radially extending opening 143 for receiving the tool bit 27. A set screw 145 is provided for adjusting the radial extension of tool bit 27 and two set screws 147 are provided for locking the tool bit in place.

The operating procedure for the tool 9 is as follows, after the cover of the governor chest is removed a tool head 17 placed on the tool, a suitable adapter plate 73 mounted on top of the governor chest, and the mounting plate 75 mounted on plate 73. Screws 127 are adjusted to position the axis of shaft 35 over the center of the nozzle to be removed if there should be a slight misalignment of the axis of shaft 35 with the axis of the nozzle. Next, lock ring 37 is adjusted a distance above housing 31 equal to the distance the tool head is to be advanced downwardly. The rotary power source (not shown) is turned on to rotate shaft 35. While the shaft is rotating, handle 67 is turned to axially advance feed screw 33 and shaft 35. This is continued until lock ring 37 engages housing 31 and prevents further advancement. Handle 67 is then turned to raise shaft 35 so that the work may be inspected. If cutting to a deeper depth is required, lock ring 37 is rotated to raise it by the amount of additional cut that is desired. Handle 67 is then turned again to lower shaft 35 while the shaft is rotated by the power source.

When the cutting has proceeded to the point where weld material 15 is completely removed, the mounting plate screws 87 are removed and the tool, minus the adapter plate 73, lifted from the governor chest. The nozzle is then extracted. If refinishing is needed, a cutter head 25 is placed on shaft 35, and the mounting plate replaced on the top of the adapter plate 73. The nozzle seating surfaces are then refinished by rotationally driving shaft 35 while advancing the shaft by means of handle 67. As with the weld-removing operation, the depth of cut may be limited using the lock ring 37.

After one nozzle site is finished, the screws 87 are removed and the mounting plate 75 shifted relative to adapter plate 73 to place drive shaft 35 over the next nozzle to be removed.

While a preferred embodiment of the invention has been described in specific detail, it will be understood that various modifications and substitutions may be made in the embodiment shown without departing from the spirit and scope of the invention as defined by the appended claims.

I claim:

1. A cutting tool for removing nozzles from a governor chest, said nozzles being seated in and welded to the bottom of said governor chest, said cutting tool comprising:
   an adapter plate having an elongated opening therein and adapted for mounting on the top of the governor chest after the cover has been removed therefrom;
   means for attaching said adapter plate to the governor chest;
   a drive shaft;
   support means supporting said drive shaft for movement along and about its own axis, said support means supporting said drive shaft in a position extending through said opening whereby the top of said drive shaft is above the plane of said adapter plate and the bottom is within said governor chest;
   attachment means for fixedly attaching said support means to said adapter plate at any one of a plurality of lateral positions, the axis of said drive shaft being centered over one of said nozzles at each of said lateral positions;
   a cutter head attached to said drive shaft and carrying tool bit means on said cutter head for cutting the weld material which welds said nozzles to the bottom of said governor chest; and,
   means for rotating and axially advancing said drive shaft.

2. A cutting tool as claimed in claim 1 wherein said support means includes a mounting plate and said attachment means includes dowels and screws, said mounting plate having a set of openings into which said dowels and screws may be inserted and said adapter plate having a plurality of sets of holes for receiving said dowels and screws after they have passed through said mounting plate, said adapter plate having a number of sets of holes corresponding to the number of said lateral positions.

3. A cutting tool as claimed in claim 2 wherein said support means further comprises a housing surrounding said drive shaft and having an annular flange; an adjusting plate; means fixedly securing said flange to said adjusting plate; a retainer plate surrounding said adjusting plate; means fixedly securing said retainer plate to said mounting plate, said retainer plate having an annular abutment extending over said adjusting plate whereby said adjusting plate is retained against said mounting plate; and a plurality of screws extending radially inwardly through said retainer plate for adjusting the position of said adjusting plate in a plane normal to the axis of said drive shaft.

4. A cutting tool as claimed in claim 1 wherein said cutter head includes a cutter body having a recess in its lower surface whereby the upper extremity of a nozzle may pass into said recess as said tool bit means cuts said weld material.

5. A cutting tool as claimed in claim 4 wherein said tool bit means comprises two bits and means for mounting said tool bits at diametrically opposed positions on said cutter body.

6. A cutting tool as claimed in claim 1 wherein said tool bit means comprises two bits and means for mounting said tool bits at diametrically opposed positions on said cutter head.

7. A cutting tool as claimed in claim 6 wherein said tool bits are mounted to traverse different but overlapping annular paths as said drive shaft is rotated.

8. A cutting tool as claimed in claim 7 wherein the one of said tool bits has a cutting edge for cutting to a planar surface and the other of said tool bits has a cutting edge for cutting to a curved surface.

* * * * *